United States Patent
Guo et al.

(10) Patent No.: US 9,032,507 B2
(45) Date of Patent: May 12, 2015

(54) ACCESS REQUEST AUTHENTICATION AND AUTHORIZATION INFORMATION GENERATION

(71) Applicant: International Business Machines Corporation, Armonk, NY (US)

(72) Inventors: Chang Jie Guo, Beijing (CN); Hongbin Lin, Beijing (CN); Peng Ji, Shanghai (CN); Feng Li, Shanghai (CN); Qian Ma, Beijing (CN); Lin Yang, Beijing (CN); Yu Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 96 days.

(21) Appl. No.: 13/778,310

(22) Filed: Feb. 27, 2013

(65) Prior Publication Data

US 2013/0227676 A1      Aug. 29, 2013

(30) Foreign Application Priority Data

Feb. 29, 2012    (CN) .......................... 2012 1 0049872

(51) Int. Cl.
  *G06F 21/31*    (2013.01)
  *G06F 21/62*    (2013.01)
(52) U.S. Cl.
  CPC ............ *G06F 21/31* (2013.01); *G06F 21/6218* (2013.01); *G06F 2221/2137* (2013.01)
(58) Field of Classification Search
  None
  See application file for complete search history.

(56) References Cited

U.S. PATENT DOCUMENTS

| | | | | |
|---|---|---|---|---|
| 5,091,939 | A  * | 2/1992  | Cole et al. ...................... | 713/183 |
| 5,226,080 | A  * | 7/1993  | Cole et al. ...................... | 713/183 |
| 6,360,167 | B1 * | 3/2002  | Millington et al. ........... | 701/516 |
| 7,278,024 | B2   | 10/2007 | Sundararajan et al. | |
| 7,571,489 | B2   | 8/2009  | Ong et al. | |
| 7,940,160 | B2   | 5/2011  | Arakawa | |
| 8,046,587 | B2   | 10/2011 | Gantman et al. | |
| 8,087,074 | B2   | 12/2011 | Popp et al. | |
| 8,098,128 | B2   | 1/2012  | Arakawa | |
| 8,434,138 | B2   | 4/2013  | Popp et al. | |
| 2003/0048174 | A1 | 3/2003 | Stevens et al. | |
| 2005/0254514 | A1* | 11/2005 | Lynn .............................. | 370/450 |
| 2007/0130472 | A1 | 6/2007 | Buer et al. | |
| 2007/0234064 | A1* | 10/2007 | Nihei .............................. | 713/183 |
| 2008/0034422 | A1 | 2/2008 | Al-Azzawi | |
| 2010/0287265 | A1* | 11/2010 | Hu et al. ....................... | 709/221 |
| 2011/0307683 | A1* | 12/2011 | Spackman .................... | 711/216 |
| 2012/0117605 | A1* | 5/2012 | Miao et al. .................... | 725/115 |
| 2012/0323941 | A1* | 12/2012 | Chkodrov et al. ............ | 707/756 |

FOREIGN PATENT DOCUMENTS

| | | |
|---|---|---|
| CN | 1877060 B | 6/2011 |
| WO | WO 2011083867 | 7/2011 |

* cited by examiner

*Primary Examiner* — Dede Zecher
*Assistant Examiner* — Richard McCoy
(74) *Attorney, Agent, or Firm* — Mark G. Edwards; Jeff Tang

(57) ABSTRACT

An access request authentication method, an authorization information generation method, an access request authentication system, and a hardware device. The access request authentication method includes: obtaining the current clock information; receiving a first access request, where the first access request includes a first input code; and determining whether to authorize the first access request based on the current clock information and the first input code.

16 Claims, 8 Drawing Sheets

Fig.6A                    Fig.6B

ACCESS REQUEST AUTHENTICATION AND AUTHORIZATION INFORMATION GENERATION

CROSS-REFERENCE TO RELATED APPLICATION

This application claims priority under 35 U.S.C. §119 from Chinese Patent Application No. 201210049872.8 filed Feb. 29, 2012, the entire contents of which are incorporated herein by reference.

BACKGROUND OF THE INVENTION

1. Field of the Invention

The present invention generally relates to the data processing field, and more particularly, the present invention relates to an access request authentication method, an authorization information generating method, an access request authentication system and a hardware device.

2. Description of the Related Art

Authorization is a process allowing specific users to access specific devices, including specific information on the devices. Authenticating the authorization can rule out those unauthorized accesses. Controlling access rights serves two types of purposes: one is to safeguard the security of items, to prevent them from being stolen or destroyed by others; the other is to protect information security, e.g., on some devices being stored large amount of information involving individual privacy, trade secrets etc. There are many traditional methods for authenticating an access request to a device, including using a traditional lock, or using a traditional password lock, etc.

However, traditional device authorization management has many defects. For example, when using a traditional lock to perform device management, if a plurality of visitors are to access the device, then either a plurality of copies of the traditional key should be made, or the same key should be passed on among the plurality of visitors. Using the former method will not only cause potential safety hazards, but it also makes it difficult to manage access to the device according to the access time; using the latter method may cause loss of the key and may incur high cost of key management.

Rights management of some current devices is by a password lock, and the device can only be accessed by the people who input the right password. However, the current password lock cannot distinguish between people. That is to say, if several people are to access the device at different times, these people will obtain the same access password, which thus is not conducive for rights management, nor for distinguishing between the periods of responsibility of respective visitors. Currently, the passwords of some password locks can be changed constantly. Each time before being visited, the device will communicate with the management center to obtain the current valid password. This solution needs the device to be networked, and is not suitable for devices which may work offline.

SUMMARY OF THE INVENTION

Accordingly, one aspect of the present invention provides an access request authentication method, the method including the steps of: obtaining the current clock information; receiving a first access request, where the first access request includes a first input code, where the first input code is generated based on an authorization start time and an authorization duration condition; and determining whether to authorize the first access request based on the current clock information and the first input code.

Another aspect of the present invention provides an authorization information generating method, the method including the steps of: receiving a request for generating authorization information; generating a first input code based on an authorization start time and an authorization duration condition; and generating authorization information, wherein the authorization information includes the first input code.

Another aspect of the present invention provides a systems for access request authentication, the system including: obtaining means configured to obtain the current clock information; first receiving means configured to receive a first access request, where the first access request includes a first input code, and the first input code is generated based on an authorization start time and an authorization duration condition; and second determining means configured to determine whether to authorize the first access request based on the current clock information and the first input code.

Another aspect of the invention provides a hardware device, the hardware device configured to be installed with the above-mentioned access request authentication system to determine whether to authorize access to the hardware device.

Compared with the prior art, the present invention includes at least two advantages: first, the present invention can perform more fine-grained and flexible control on authorization. The present invention can control authorization to access based on an authorization duration condition (e.g., the length of time to authorize access). For example, different device maintenance persons may be assigned different input codes to access the device in different time periods. Second, the present invention generates a first input code based on an authorization start time and an authorization duration condition; therefore, the present invention can realize offline authentication without relying on a network making the present invention more suitable for regions where there is no network, the network is not reliable, or the cost of the network is high.

In the following section of specific embodiments of the invention, the above and other advantages of the present invention will be explained in great detail in conjunction with more specific embodiments.

BRIEF DESCRIPTION OF THE DRAWINGS

Through the more detailed description of exemplary embodiments of the present disclosure below in conjunction with the accompanying drawings, the above and other objects, features and advantages of the present disclosure will become more apparent, wherein like reference numerals generally refer to like components in the exemplary embodiments of the present disclosure.

FIG. 6A shows an exemplary diagram of authorization information according to an embodiment of the present invention.

FIG. 6B shows an exemplary diagram of authorization information according to another embodiment of the present invention.

DETAILED DESCRIPTION OF THE PREFERRED EMBODIMENTS

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
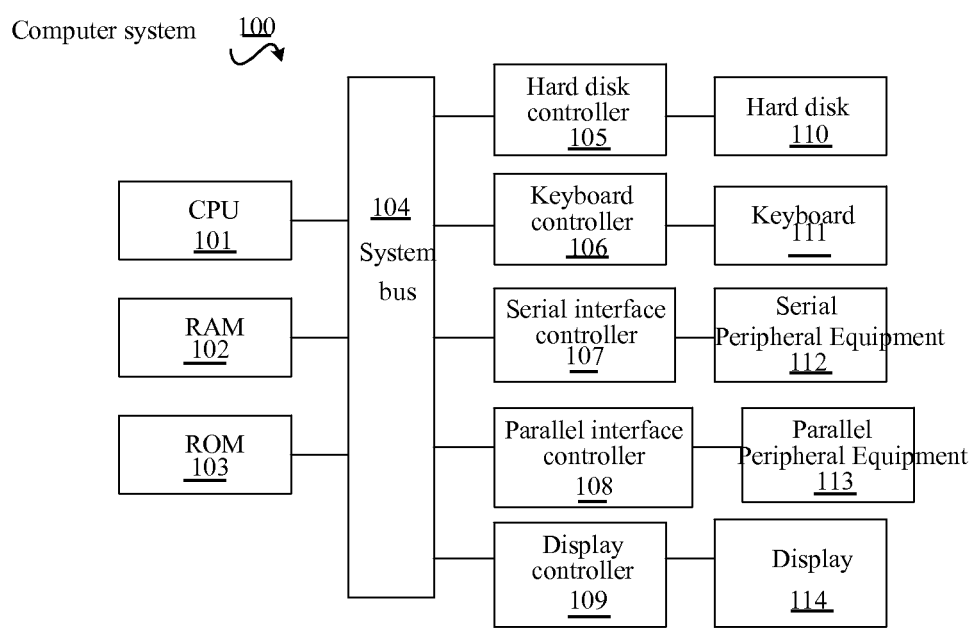
FIG. 1 shows a block diagram of an exemplary computing system adapted to realize an embodiment of the present invention.

FIG. 1 shows an exemplary computer system 100 which is applicable to implement the embodiments of the present invention. As shown in FIG. 1, computer system 100 may include: CPU (Central Process Unit) 101, RAM (Random Access Memory) 102, ROM (Read-Only Memory) 103, bus system 104, hard disk controller 105, keyboard controller 106, serial interface controller 107, parallel interface controller 108, display controller 109, hard disk 110, keyboard 111, serial peripheral 112, parallel peripheral 113 and display 114. Among above devices, CPU 101, RAM 102, ROM 103, hard disk controller 105, keyboard controller 106, serial interface controller 107, parallel interface controller 108 and display controller 109 are coupled to the bus system 104. Hard disk 110 is coupled to hard disk controller 105. Keyboard 111 is coupled to keyboard controller 106. Serial peripheral 112 is coupled to serial interface controller 107. parallel peripheral 113 is coupled to parallel interface controller 108. Display 114 is coupled to display controller 109. It should be understood that the structure as shown in FIG. 1 is only for the exemplary purpose rather than any limitation to the present invention. In some cases, some devices may be added to or removed from the computer system 100 based on specific situations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. This is a non-exhaustive list. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
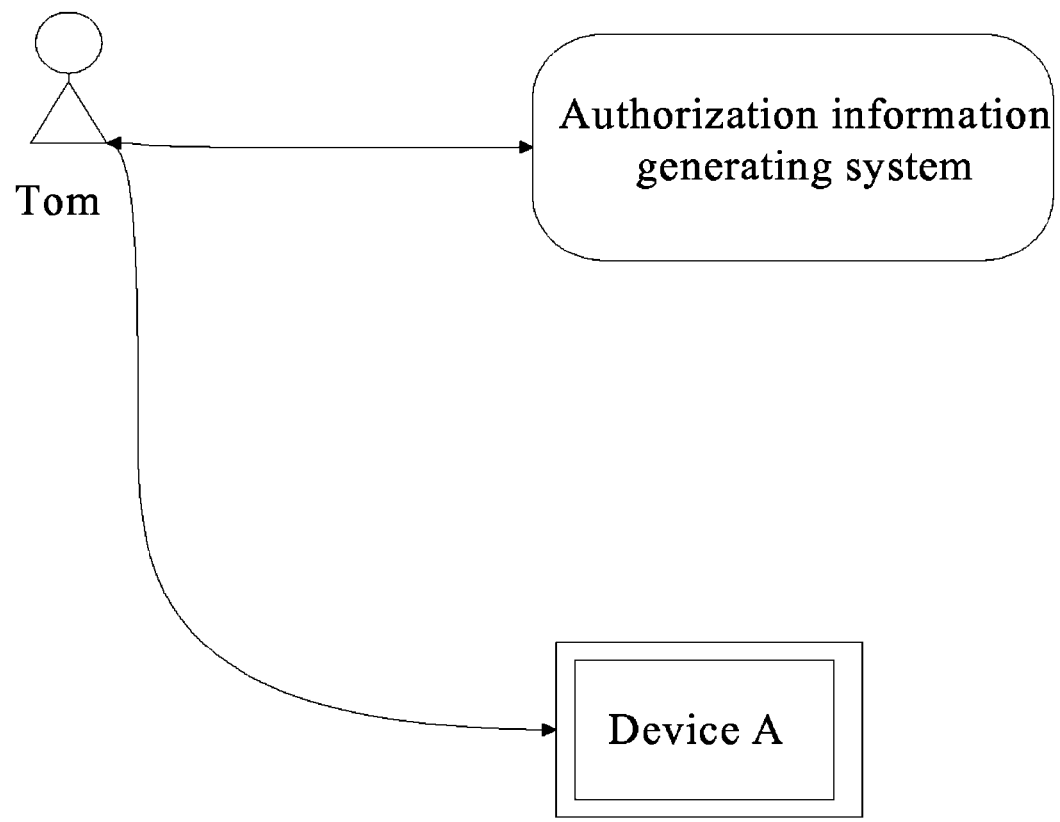
FIG. 2 shows a schematic diagram of an application scenario according to an embodiment of the present invention.

FIG. 2 shows a schematic diagram of an application scenario according to an embodiment of the present invention. In this application scenario, suppose Device A is a server placed in an open field, which is responsible for collecting, sorting out and relying on data collected by sensors. Not only is Device A expensive, but it also stores a large amount of confidential data, e.g., the current operating status of a power distribution network, daily flow of oil pipelines, etc.

Therefore, the security of Device A is very important, and the rights to access to Device A must be controlled. Since Device A is placed in an open field, the network and power supply do not have adequate reliability, and thus a measure ensuring the security of Device A cannot assume that the network and power supply always exist, e.g., the measure should be able to work when there is no network connection, or to run for a relatively long time on battery power.

Tom is one of many maintenance persons of a device maintenance group of the Internet of Things, and Tom is assigned to repair Device A in this task. Because there may be many people in the maintenance group to support different companies' maintenance tasks of various devices of the Internet of Things, the person assigned for repairing Device A at a given time is not fixed. Therefore, Device A is not suitable for protection by a traditional lock or a traditional password lock, where authorization management and separation of duty are expensive or even impossible to meet security standards.

In the embodiment illustrated in FIG. 2, Device A will be protected by using passwords which are continuously changed over time. Tom must first access the authorization information generation system, which may be stored on the company's server, for example, and Tom may obtain the authorization information by accessing the system via a computer. The authorization information identifies that Tom will be authorized to access Device A in the consecutive five hours starting from nine o'clock tomorrow morning, and Tom shall repair Device A in those five hours, and the authorization information will automatically become invalid after two o'clock tomorrow afternoon. The authorization information generation system is physically isolated with Device A.

Although the description of various embodiments of the present invention is directed towards the maintenance person Tom repairing Device A, it is described as an example, the present invention is not limited to such an application scenario, and is suitable for any other application scenarios.

Figure 3:
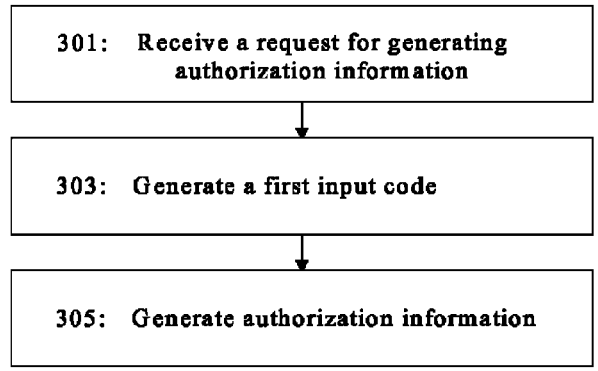
FIG. 3 shows a flow chart of an authorization information generating method according to an embodiment of the present invention.

FIG. 3 shows a flow chart of an authorization information generation method according to an embodiment of the present invention. At step 301, a request is received for generating authorization information. At step 303, a first input code is generated based on an authorization start time and an authorization duration. At step 305, authorization information is generated where the authorization information includes the first input code.

The following describes in greater detail the respective steps in FIG. 3. At step 301, a request is received for generating authorization information. The content of the request can include generating authorization information, e.g., for the maintenance person Tom to access Device A, so as to repair Device A. The request may be triggered by an automatic task assigning mechanism, or can be triggered on request by the maintenance person Tom, and the present invention has no limitation as to manner in which the request is triggered.

At step 303, a first input code is generated based on the authorization start time and authorization duration condition. The first input code will be the key information for Tom to access Device A. The information in the first input code will indicate the start time that Tom is authorized to access Device A. For example, from nine o'clock am on Feb. 1, 2012, Tom may visit Device A. In the embodiment shown in FIG. 3, the authorization duration condition is the authorization end time, e.g., Tom is authorized to access Device A before 2 pm Feb. 1, 2012.

In another embodiment of the present invention, the authorization duration condition is an authorization duration, e.g., Tom is authorized to access Device A within five hours after the authorization start time. In yet another embodiment of the present invention, the authorization duration condition is a number of times of authorization, e.g., Tom is authorized to access Device A five times after the authorization start time. In other embodiments of the present invention, the authorization duration condition can be a combination of one or more of an authorization end time, an authorization duration, and a number of times of authorization.

The unit of the authorization start time, authorization end time and authorization duration involved in the embodiments of the present invention may be adjusted according to specific needs, and may be specifically a hour, minute, day, etc., and the present invention is not limited to these.

Using the authorization end time or authorization duration to limit access by the visitor may improve the security of the device so that the visitor can only access the device in a specific time period. Outside the specific time period, even if the first input code is stolen by others, others cannot access the device with the stolen first input code. Also, using a number of times of authorization to limit visitor access by a visitor also helps to improve the security of device, and such an implementation is suitable for scenarios in which the access time lengths cannot be estimated accurately in advance.

The present invention has no limitation as to the form of the first input code. In an embodiment of the present invention, the first input code may be represented as a piece of complete information, e.g., a segment of a string of numbers "09876556", part (e.g., "0987") of which is related to the authorization start time, and the other part (e.g., "6556") is related to the authorization duration condition. In another embodiment of the present invention, the first input code is segmented into two pieces of information, e.g., two strings of numbers, where one piece of information (e.g., "0987") represents the authorization start time, and the other piece of information (e.g., "6556") represents the authorization duration condition.

At step 305, authorization information is generated, the authorization information includes the first input code. The authorization information can include one or more of the following types of information: the name or code of the maintenance person, code of the device to be accessed, description of the task to be executed, authorization start time and authorization duration condition, etc. Therein, although the information of the authorization start time and authorization duration condition is related to the first input code, it can also be included in the authorization information explicitly. The authorization information can be handled by Tom on a printed worksheet, or it may be electronically transmitted to him on a mobile phone or other electronic device. The following provides more visualized examples to illustrate the form of authorization.

Figure 4:
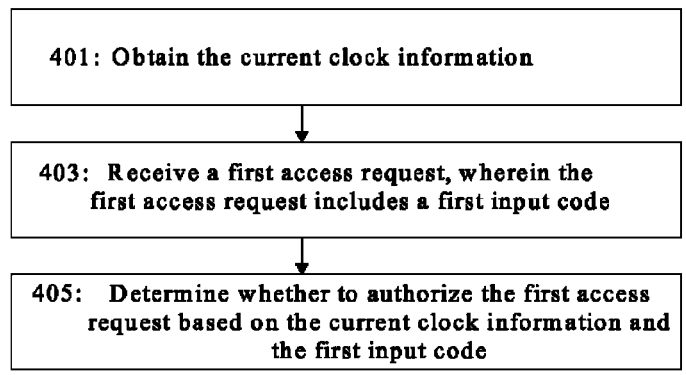
FIG. 4 shows a flow chart of an access request authentication method according to an embodiment of the present invention.

FIG. 4 shows a flow chart of an access request authentication method according to an embodiment of the present invention. At step 401, current clock information is obtained; at step 403, a first access request is received, where the first access request includes a first input code, and the first input code is generated based on an authorization start time and an authorization duration condition; and at step 405, it is determined whether to authorize the first access request based on the current clock information and the first input code.

The following describes the respective steps in FIG. 4 in greater detail. At step 401, the current clock information is obtained. The granularity of the clock information may be set based on different requirements, e.g., hours (e.g., 10 am on Feb. 1, 2012), minutes (e.g., 10:01 am on Feb. 1, 2012), days (e.g., Feb. 1, 2012) etc., and the present invention is not limited to these bases.

At step 403, a first access request is received, where the first access request includes a first input code, where the first input code is generated based on an authorization start time and authorization duration condition. For example, the authorization start time may be 9 am, Feb. 1, 2012. The authorization duration condition may be at least one of the following: an authorization end time; an authorization duration; a number of times of authorization. The first access request can also include other information, e.g., the name or code of the maintenance person, the code of the device to be accessed, description of the task to be executed, an authorization start time and authorization duration condition, etc. The present invention has no limitation as to the specific manner of issuing the first access request, and the first access request may be issued to the device to be accessed by the user manually inputting the first input code on the keyboard of the Device A, or the user may scan the first input code (e.g., one-dimensional code or two-dimensional code) into the access request authentication system of Device A to issue the first access request, or the first access request may be issued in other manners.

Although step 401 is prior to step 403 in the embodiment shown in FIG. 4, the present invention is not limited as to the sequence of steps 401 and 403. Step 403 can be performed prior to step 401, or the two steps can be performed in parallel.

At step 405, the system determines whether to authorize the first access request based on the current clock information and the first input code. According to an embodiment of the present invention, step 405 may also include the step of comparing the current clock information with the authorization start time, e.g., determining whether the current clock information is not earlier than the authorization start time. Only when the current clock information is not earlier than the authorization start time (e.g., the current clock time is 10 am, while the authorization start time is 9 am) can the first access request possibly be authorized.

If the authorization duration condition includes an authorization end time, step 405 further includes comparing the current clock information and the authorization end time, e.g., determining whether the current clock information is not later than the authorization end time. According to this embodiment of the present invention, if the current clock information is not earlier than the authorization start time, and the current clock time is not later than the authorization end time (e.g., the current clock time is 1 pm, while the authorization end time is 2 pm), then the first access request is authorized.

If the authorization duration condition includes an authorization duration, step 405 further includes comparing the current clock information with the sum of the authorization start time and the authorization duration, e.g., determining whether the current clock information is not later than the sum of start time of the authorization and authorization duration. According to this embodiment of the present invention, if the current clock information is not earlier than the authorization start time, and the current clock information is not later than the sum of the authorization start time and the authorization duration (e.g., the current clock is 1 pm and the authorization start time is 9 am, the authorization duration is five hours, and the sum of the authorization start time and the authorization duration is 2 pm), then the first access request is authorized.

If the authorization duration includes a number of times of authorization, then step 405 further includes determining whether the first access request has used up the number of times of authorization. According to this embodiment of the present invention, if the current clock information is not earlier than the authorization start time, and the first access request has not used up the number of times of authorization (e.g., the number of times of authorization is five, and the current first access request is merely the second access), then the first access request is authorized.

To further increase the security of access, if the authorization duration condition includes an authorization end time, the access request authentication method of the present invention can further include the step of issuing an indication of prohibiting authorization if the current clock information is later than the authorization end time. If the authorization duration condition includes an authorization duration, the access request authentication method can further include the step of issuing an indication that authorization is prohibited if the current clock information is later than the sum of the authorization start time and authorization duration. For example, the indication may be an alarm signal of sound or light. According to an embodiment of the present invention, the alarm signal may be issued within or around the device to be accessed. According to another embodiment of the present invention, the alarm signal may be issued at a remote site from the device to be accessed. According to yet another embodiment of the present invention, the indication can directly indicate that access to the device is prohibited or the device is closed.

Figure 5:
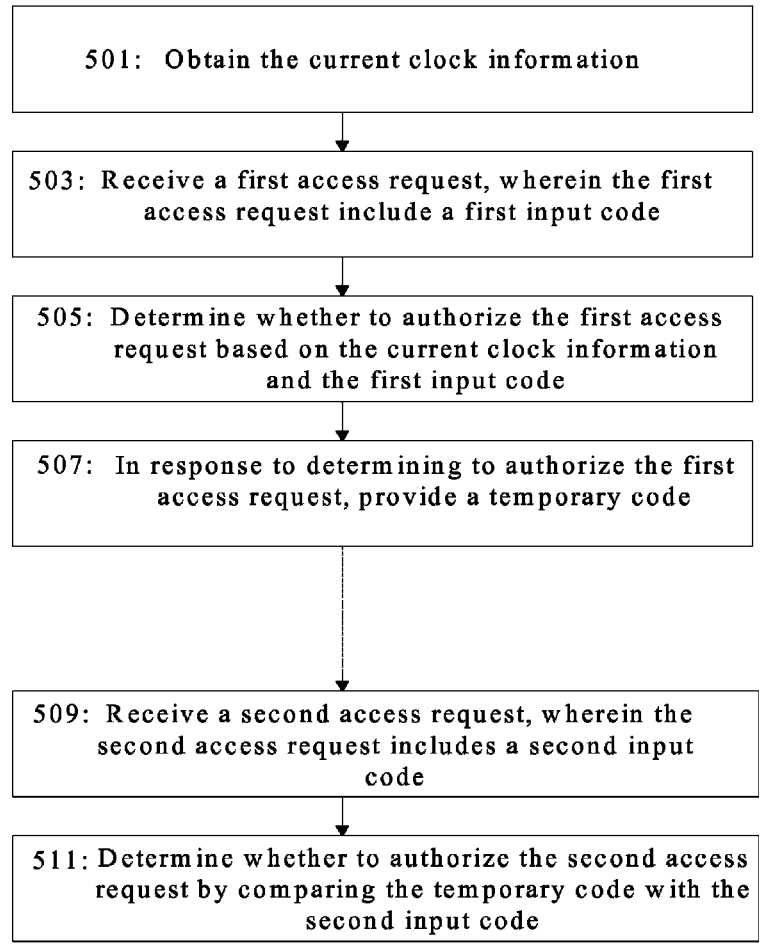
FIG. 5 shows a flow chart of an access request authentication method according to another embodiment of the present invention.

FIG. 5 shows a flow chart of an access request authentication method according to another embodiment of the present invention. In step 501 in FIG. 5, the current clock information is obtained. Step 501 is consistent with step 401 in FIG. 4. In step 503 in FIG. 5, a first access request is received, where the first access request includes a first input code. The first input code is generated based on an authorization start time and an authorization duration condition. Step 503 is consistent with step 403. In step 505 in FIG. 5, it is determined whether to authorize the first access request based on the current clock information and the first input code. Step 505 is consistent with Step 405 in FIG. 4.

At step 507, a temporary code is provided in response to determining to authorize the first access request, provide a temporary code, where the temporary code remains valid while the authorization duration condition is satisfied. If first input code is a string of codes manually input, and the maintenance person Tom needs to access Device A for many times, then it will be a very tedious process to require Tom to manually input a string of codes (e.g., 8-bit or 16-bit or longer) many times. Therefore, in order to simplify the process of manually inputting the first input code, when Tom first obtains authorization to access the device, he may be provided with a string of simplified temporary code, and the number of bits of the temporary code may be shorter (e.g., 4-bit), and thus enabling Tom to easily access Device A in subsequent processes, without the need to input the lengthy first input code many times.

At step 509, a second access request is received, where the second access request includes a second input code. The second input code may be a short character string manually input by the user.

At step 511, the determination is made whether to authorize the second access request by comparing the temporary code with the second input code. It should be noted that the temporary code remains valid while the authorization duration condition is satisfied, that is to say, if the authorization duration condition is no longer satisfied, for example, if the authorization end time is passed, the maintenance person Tom could no longer access Device A by inputting the second input code.

The present invention is not limited to the implementation of manually inputting the first input code in the first access request, and in another embodiment receiving the first access request includes receiving an input one-dimensional code or two-dimensional code by a one-dimensional code scanner or a two-dimensional code scanner, and parsing the one-dimensional code or two-dimensional code to obtain the first input code. Obtaining the first input code through the one-dimensional code or two-dimensional code may save the time of manually inputting the first input code, and improve user experience.

FIG. 6A shows an exemplary diagram of authorization information according to an embodiment of the present invention. In the example of FIG. 6A, the authorization information includes: a task number, the name of the maintenance person, task description, authorization start time, authorization end time and first input code, where the first input code ("09876556") is recorded in the authorization information in the form of a number string. Specially, in the first input code, "0987" is related to the authorization start time $t_n$, and "6556" is related to the authorization end time $t_m$. The character string in FIG. 6A may also be replaced by other types of character string.

FIG. 6B shows an exemplary diagram of authorization information according to another embodiment of the present invention. In the example of FIG. 6B, the authorization information includes: task number, name of the maintenance person, task description, authorization start time, authorization duration (in hours) and first input code, and the first input code is recorded in the authorization information in the form of a bar code, the bar code belonging to a type of one-dimensional code.

Figure 6C:
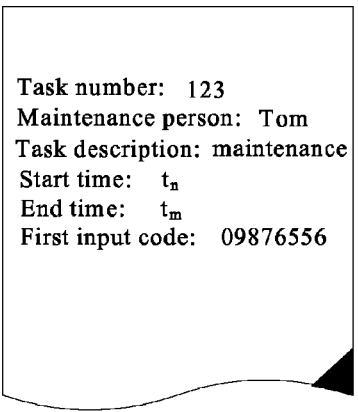
FIG. 6C shows an exemplary diagram of authorization information according to another embodiment of the present invention.
Figure 6C:
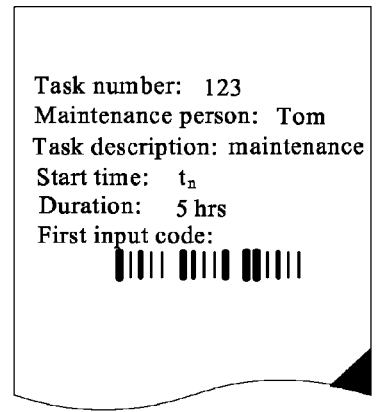
Figure 6C:
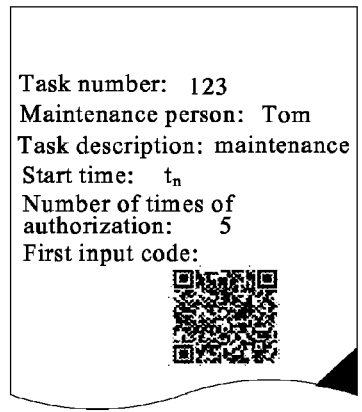

FIG. 6C shows an exemplary diagram of authorization information according to another embodiment of the present invention. In the example of FIG. 6C, the authorization information includes: task number, name of maintenance person, task description, authorization start time, number of times of authorization (e.g., five times) and first input code, where the first input code is recorded in the authorization information in the form of a two-dimensional code.

The information of task number, name of maintenance person, task description, authorization start time, authorization end time can also be excluded altogether from or included in parts in the authorization information.

It should be noted that the code type of the first input code is irrelevant to the authorization duration condition. No matter whether the authorization duration condition (if any) in the authorization information is a authorization end time, authorization duration or number of times of authorization, the first input code in authorization information can use any one or more of a character string, one-dimensional code, two-dimensional code or other code types. The first input code may be expressed in multiple code types, e.g., the authorization start time can be expressed in one code type, while the authorization end time expressed in another code type.

The following describes in detail a specific manner of determining whether to authorize the first access request.

According to an embodiment of the present invention, the access request authentication method further includes the step of generating a password sequence based on clock information, and the step of determining whether to authorize the first access request (step 405 in FIG. 4) further includes searching for the first input code in the password sequence; and determining whether to authorize the first access request based on the search result.

The present invention may be applied to verify the authorization of an off-line device. That is to say, there is no need for Device A to be network connected, and no need to negotiate the first input code with the end generating the authorization information. Therefore, in the present invention, the end generating the authorization information and the end authenticating the access request can follow the same password generation logic, e.g., both generating the password based on the time. Thus, if only the clocks at the two ends are synchronous, the two ends can generate the same password by following the same time, i.e., the end generating the authorization information can generate the first input code based on the clock information, and the end authenticating the access request can generate the password sequence based on clock information so as to authenticate.

Figures 7, 8:
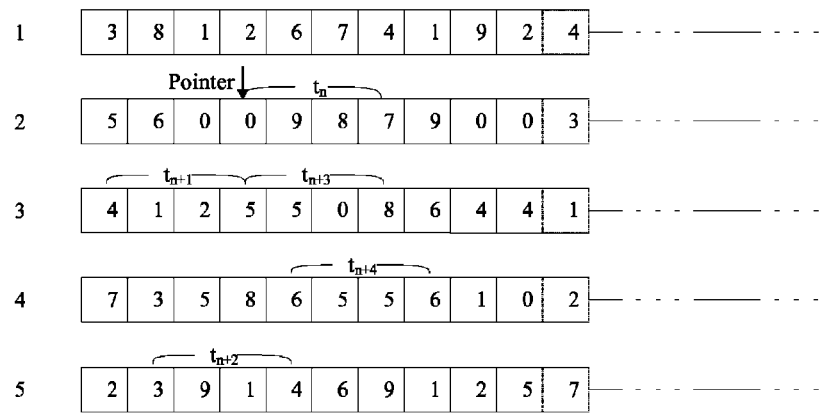
FIG. 7 shows a schematic diagram of a password matrix according to an embodiment of the present invention.
FIG. 8 shows a password sequence generated according to clock information according to an embodiment of the present invention.

The following illustrates how to generate a password sequence for authenticating an access request based on the clock information in conjunction with FIGS. 7 and 8. FIG. 7 shows a schematic diagram of a password matrix according to an embodiment of the present invention. In this embodiment, suppose the password matrix is 5 character strings, and the length of each character string is 100 (FIG. 7 does not show the entire string due to space constraints), the character strings are randomly generated and pre-stored. Further suppose the length of each password is 4, and the password changes every one hour. That is to say, the password remains unchanged for any time within some hour.

In order to realize the above assumption, a pointer moving with time can be set, and the pointer moves randomly with time, once an hour. For example, at time $t_n$, the pointer points to the 4$^{th}$ column of the 2$^{nd}$ row of the password matrix, and thus at time $t_n$, the password is the consecutive four numbers pointed to by the pointer, i.e., "0987".

In order to increase the change degree of the password, the password can be set as not appearing consecutively in the same character string, e.g., if at this time the password is generated from the first character string, and at the next time the password cannot be generated from the first character string, and can only be generated from another character string (e.g., the second character string). For example, at time $t_n$, password "0987" is generated from the second character string, and at time $t_{n+1}$, password "4125" is generated from the third character string. And at time $t_{n+2}$, $t_{n+3}$, $t_{n+4}$ (i.e., time $t_m$), the passwords are "3914", "5508", "6556", respectively.

In order to further increase the change degree of the password, it can also be set that each time the pointer jumps back to a character string, it cannot point to the same position. Thus at time $t_{n+1}$, the pointer points to the first column in the third character string; when the pointer returns to the third character string at time $t_{n+3}$ again, it cannot point to the first column, but to other places (e.g., the fourth column).

Thus, the password sequence generated according to the clock information is obtained as shown in FIG. 8, i.e., from time $t_n$ to time $t_{n+4}$ (i.e., time $t_m$), it is "0987", "4125", "3914", "5508" and "6556", respectively.

The manner of generating a password sequence by using a password matrix as shown in FIGS. 7 and 8 may reduce storage space. That is to say, there is no need to store passwords of all times, and it is only needed to store a password sequence within certain window time (e.g., merely storing the respective 50 passwords before and after the current clock information) and the password matrix. And in the password matrix, since the pointer moves with time, though there may be some constraints on the moving manner, the password sequence is hard to be cracked. That is to say, even if a hacker cracks the password matrix, he cannot obtain the password of the next time.

If the authorization duration condition is an authorization end time, the first input code can be a character string of a length of eight bits, including two parts, four bits in each part, where the former four bits are related to the authorization start time, and the latter four bits are related to the authorization end time. The step of searching for the first input code in the password sequence may further be realized as searching for the former four bits of the first input code in the password sequence to obtain the authorization start time, and search for the latter four bits in the first input code to obtain the authorization end time.

Next, the determination is made whether to authorize the first access request based on the search result. For example, based on the search result in paragraph [0078], if the current clock information (e.g., time $t_{n+1}$) is not earlier than the authorization start time (e.g., time $t_n$), and the current clock information (e.g., time $t_{n+1}$) is not later than the authorization end time (time $t_{n+4}$), the first access request is authorized. In contrast, if any one of the above two conditions is not satisfied, e.g., the current clock information (e.g., time $t_{n-1}$) is earlier than the authorization start time (e.g., time $t_n$), or the current clock information (e.g., time $t_{n+5}$) is later than the authorization end time (e.g., time $t_{n+4}$), the first access request is rejected.

If the authorization duration condition is an authorization duration, the first input code can be a character string of a length of six bits, including two parts, where the former four bits are related to the authorization start time, and the latter two bits are related to the authorization duration (e.g., the authorization duration is five hours, and the latter two bits are "05"). The step of searching for the first input code in the password sequence may further be realized as searching for the former four bits of the first input code in the password sequence to obtain the authorization start time. The authorization duration can also be encoded in some other manner.

Next, the determination is made whether to authorize the first access request based on the search result. For example, based on the search result in paragraph [0080], if the current clock information (e.g., time $t_{n+1}$) is not earlier than the authorization start time (e.g., time $t_n$), and the current clock information (e.g., time $t_{n+1}$) is not later than the sum (e.g., time $t_{n+4}$) of the authorization start time (e.g., time $t_n$) and the authorization duration (e.g., 5 hours), authorize the first access request. In contrast, if any one of the above two conditions is not satisfied, e.g., the current clock time (e.g., time $t_{n-1}$) is earlier than the authorization start time (e.g., time $t_n$), or the current clock information (e.g., time $t_{n+5}$) is later than the sum (e.g., time $t_{n+4}$) of the authorization start time (e.g., time $t_n$) and the authorization duration (e.g., five hours), the first access request is rejected.

If the authorization duration condition is a number of times of authorization, the first input code can be a character string of a length of six bits, including two parts, where the former four bits are related to the authorization start time, while the latter two bits are related to the number of times of authorization (if the number of times of authorization is five, then the latter two bits are "05"). The step for searching for the first input code in the password sequence may further be realized as searching for the former four bits of the first input code in the password sequence to obtain the authorization start time. The number of times of authorization can also be encoded in any other manners.

Next, the determination is made whether to authorize the first access request based on the search result. For example, based on the search result of paragraph [0082], if the current clock information (e.g., time $t_{n+1}$) is not earlier than the authorization start time (e.g., time $t_n$), and the first access request has not used up the number of times of authorization (e.g., five), the first access request is authorized. In contrast, if any one of the above two conditions is not satisfied, e.g., the current clock information (e.g., time $t_{n-1}$) is earlier than the authorization start time (e.g., time $t_n$), or the current access request has used up the number of times of authorization (e.g., the current access is Tom's sixth access), reject the access request. In one embodiment, Tom's number of access times can be calculated by a count-down calculator.

For the same reason, the authorization information generating method can also include the step of generating a password sequence based on the clock information, to generate the same sequence as shown in FIG. 8. Then, the first input code is generated according to the password sequence. For example, suppose the authorization start time is time $t_n$, the authorization end time is time $t_{n+4}$, then the former four bits of the first input code are the password "0987" to which $t_n$ corresponds, and the latter four bits of the first input code are the password "6556" to which $t_{n+4}$ corresponds. If the authorization start time is time $t_n$, the authorization duration is five hours, the first input code is "098705". If the authorization start time is time $t_n$, the number of times of authorization is five, the first input code is "098705".

Although the embodiment in paragraph [0084] is described as a manner of generating a password sequence through a password matrix, the present invention is not limited to the above embodiments, and it can generate the password sequence in other means. For example, in another embodiment, a password sequence can be randomly generated for each time in advance, e.g., the two sequences in the authorization information generating method and in the access request authentication method are completely the same and the passwords therein correspond to specific times. Still, for example, the passwords in the password sequence can be set as a function of time, such that for a specific time, the corresponding password thereof is also specific.

According to an embodiment of the present invention, the password sequence may not be generated. Taking FIG. 4 as an example: obtain the current clock information at step 401; a first access request is received at step 403, where the first access request includes a first input code, and the first input code is generated based on an authorization start time and an authorization duration condition; thereafter, parse the first input code to obtain the authorization start time and duration condition related to the first input code (not shown); then, at step 405, the determination is made whether to authorize the first access request based on the current clock information and the authorization start time and authorization duration condition parsed from the first input code.

The above embodiment described the authorization information generating method and the access request authentication method in the present invention. The following describes an authorization information generating system, an access request authentication system and hardware device under the same inventive concept in conjunction with FIGS. 9-11, where since the same or corresponding implementation details have been described above, they will not be repeated in the following.

Figure 9:
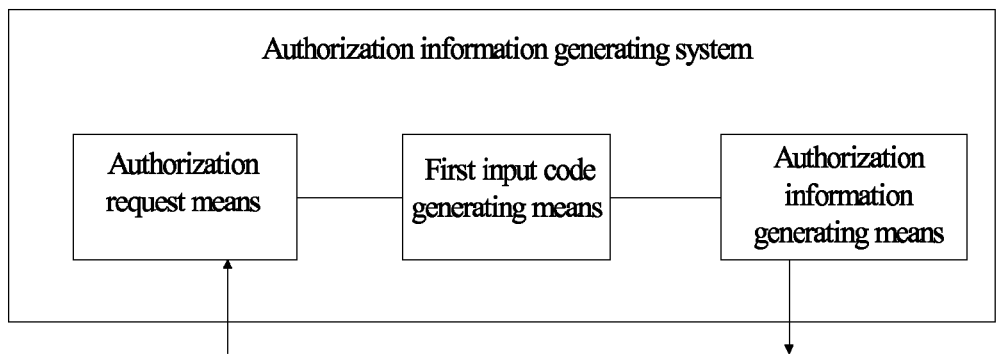
FIG. 9 shows a block diagram of an authorization information generating system according to an embodiment of the present invention.

FIG. 9 shows a block diagram of an authorization information generating system according to an embodiment of the present invention. The authorization information generating system includes authorization request means, first input code generating means, authorization information generating means, where the authorization request means is configured to receive a request to generate authorization information. The first input code generating means is configured to generate a first input code based on an authorization start time and an authorization duration condition. The authorization information generating means is configured to generate authorization information, the authorization information including the first input code.

Figure 10:
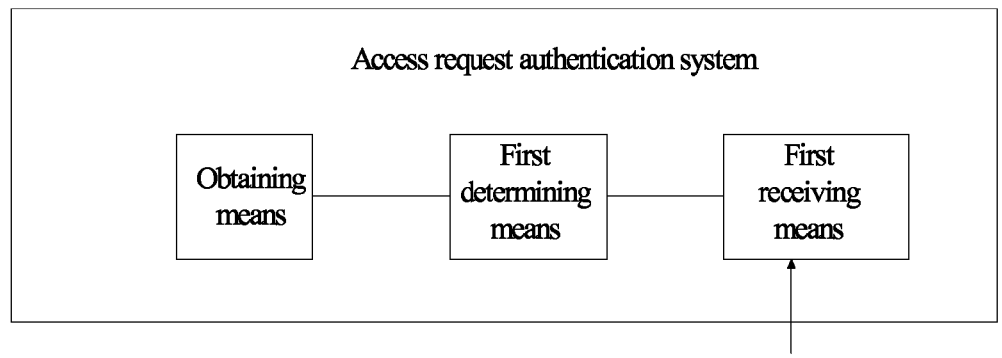
FIG. 10 shows a block diagram of an access request authentication system according to an embodiment of the present invention.

FIG. 10 shows a block diagram of the access request authentication system according to an embodiment of the present invention. The access request authentication system includes obtaining means, first receiving means and first determining means, where the obtaining means is configured to obtain the current clock information. The first receiving means is configured to receive a first access request, where the first access request includes a first input code, and the first input code is generated based on an authorization start time and an authorization duration. The first determining device is configured to determine whether to authorize the first access request based on the current clock information and the first input code, where the current clock information can be obtained by reading a clock internal to the access request authentication system, or by reading a clock outside the access request authentication system.

The first determining means in the access request authentication system can be further configured to compare the current clock information with the authorization start time.

The authorization duration condition can include at least one of the following: an authorization end time, an authorization duration, and a number of times of authorization.

If the authorization duration condition includes an authorization end time, the first determining means is further configured to compare the current clock information with the authorization end time, and in response to current clock information not earlier than the authorization start time and not later than the authorization end time, authorize the first access request.

If the authorization duration condition includes an authorization duration, the first determining means is further configured to compare the current clock information with the sum of the authorization start time and the authorization duration, and if the current clock information is not earlier than the authorization start time, and not later than the sum of the authorization start time and the authorization duration, the first access request is authorized.

If the authorization duration condition includes a number of times of authorization, the first determining device is further configured to determine whether the first access request has used up the number of times of authorization, and if the current clock information is not earlier than the authorization start time, and the first access request has not used up the number of times of authorization, the first access request is authorized.

If the authorization duration condition includes an authorization end time, the access request authentication system can further include a first indication means configured to issue an indication of prohibiting authorization in response to the current clock information being later than the authorization end time.

If the authorization duration condition includes an authorization duration, the access request authentication system can further include second indication means configured to issue an indication of prohibiting authorization if the current clock information is later than the sum of the authorization start time and the authorization duration.

The access request authentication system can further include password sequence generating means configured to generate a password sequence for authenticating access requests based on the clock information. And, the first determining means is further configured to search for the first input code in the password sequence and determine whether to authorize the first access request based on the search result.

The first receiving means in the access request authentication system can be further configured to receive an input one-dimensional code or two-dimensional code via an one-dimensional code scanner or the two-dimensional code scanner, and parse the one-dimensional code or the two-dimensional code to obtain the first input code.

Figure 11:
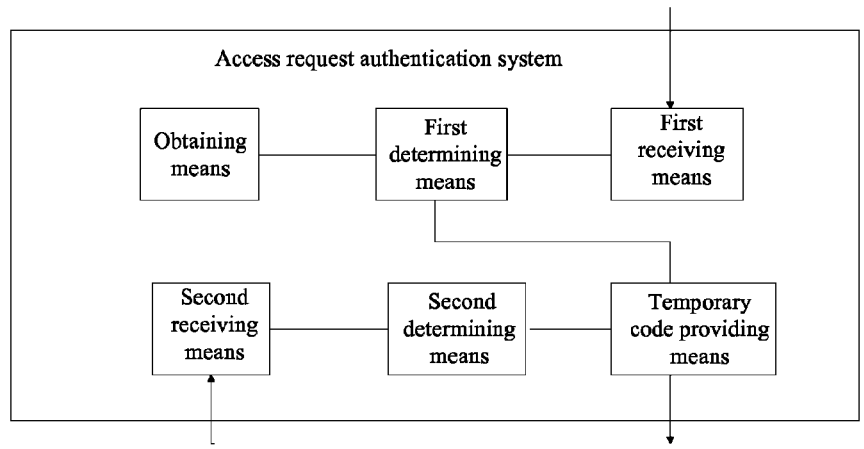
FIG. 11 shows a block diagram of an access request authentication system according to another embodiment of the present invention.

FIG. 11 shows a block diagram of an access request authentication system according to another embodiment of the present invention. The obtaining means, first determining means, are first receiving means in FIG. 11 are essentially the same as the corresponding means in FIG. 10. In addition, FIG. 11 further includes a temporary code providing means, second receiving means and second determining means.

Therein, the temporary code providing means is configured to provide a temporary code in response to determining to authorize the first access request, where the temporary code remains valid while the authorization duration condition is satisfied.

Therein, the second receiving means is configured to receive a second access request, where the second access request includes a second input code. And, the second determining means is configured to determine whether to authorize the second access request by comparing the temporary code with the second input code.

The current clock information can be from a first device, while the first input code is from a second device physically isolated from the first device.

Figure 12:
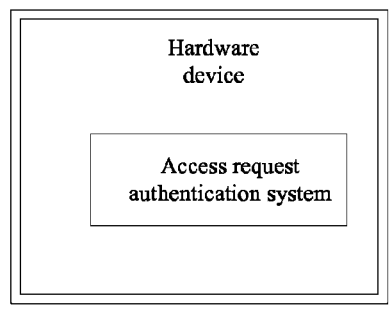
FIG. 12 shows an implementation of an access request authentication system on a hardware device according to an embodiment of the present invention.

FIG. 12 shows an implementation of an access request authentication system according to an embodiment of the present invention. The embodiment of FIG. 12 provides a hardware device (e.g., server, server chassis, service rack, etc.), which is configured to be installed with the access request authentication system to determine whether to authorize access to the hardware device. The access request authentication system can be realized in software, in hardware, or partly in software and partly in hardware. If the access request authentication system is realized in software or partly in software, its software implementation part can either be installed on the hardware device, or be installed on a separate processing platform, and the separate processing platform is further coupled to the hardware device. If the access request authentication system is realized in hardware or partly in hardware, its hardware implementation part can either be part of the hardware device, or a separate hardware unit to be coupled with the hardware device. According to an embodiment of the present invention, the hardware device can include a device generating the current clock information. According to another embodiment of the present invention, the hardware device does not include a device generating the current clock information.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. An access request authentication method, comprising:
receiving a first access request that includes a first input code,
wherein the first input code is generated by an authorization generation system configured to select a password from a password matrix according to a first pointer that moves randomly with time, and
wherein the first input code includes an authorization duration condition and a first password that corresponds with an authorization start time; and
determining, by an authentication system configured to generate a same password as the first password, whether to authorize the first access request by:
obtaining a current clock information;
generating a password sequence having a plurality of passwords based on the current clock information;
determining the authorization start time by searching for the first password in the password sequence;
authorizing access when a result of the search indicates that the current clock information is not earlier than the authorization start time;
providing a temporary code by the authentication system in response to determining to authorize the first access request, wherein the first input code has a first length, and the temporary input code has a second length shorter than the first length;
granting the temporary code validity while the first access request is authorized;
receiving a second access request, wherein the second access request includes a second input code; and
determining whether to authorize the second access request by comparing the temporary code with the second input code.

2. The method of claim 1, wherein the authorization duration condition includes an authorization end time and the current clock information is not later than the authorization end time.

3. The method of claim 1, wherein the authorization duration condition comprises:
an authorization duration and the current clock information is not later than the sum of the authorization start time and the authorization duration.

4. The method of claim 1, wherein the authorization duration condition comprises:
a number of times of authorization, and the first access request has not used up the number of times of authorization.

5. The method of claim 1, wherein the password matrix comprises:
a set of character strings that are randomly generated.

6. The method of claim 1, wherein a first clock on the authentication system is synchronous with a second clock on the authorization generation system.

7. The method of claim 1, wherein the authentication system is physically isolated from the authorization generation system.

8. An authorization information generating method, comprising:
receiving a request for generating authorization information by an authorization generation system, wherein the authorization generation system is configured to select a password from a password matrix according to a first pointer that moves randomly with time, the password matrix being a randomly generated a set of character strings, the authorization generation system being further configured to obtain clock information from a first clock;
generating, by the authorization generation system, a first input code that includes an authorization duration condition and a first password that corresponds with an authorization start time; and
generating authorization information, wherein the authorization information includes the first input code, wherein;
an authentication system is configured to receive the authorization information and to generate a same password as the first password, and
wherein the authentication system is further configured to determine whether to authorize a first access request by:
obtaining current clock information from a second clock, the second clock being synchronous with the first clock;
generating a password sequence having a plurality of passwords based on the current clock information;

determining the authorization start time by searching for the first password in the password sequence;

authorizing access when a result of the search indicates that the current clock information is not earlier than the authorization start time;

providing a temporary code by the authentication system in response to determining to authorize the first access request, wherein the first input code has a first length, and the temporary input code has a second length shorter than the first length;

granting the temporary code validity while the first access request is authorized;

receiving a second access request, wherein the second access request includes a second input code; and determining whether to authorize the second access request by comparing the temporary code with the second input code.

9. An authentication system comprising:

a memory;

a processor communicatively coupled to the memory, the authentication system configured to perform a method comprising:

receiving a first access request that includes a first input code, wherein the first input code is generated by an authorization generation system configured to select a password from a password matrix according to a first pointer that moves randomly with time, and wherein the first input code includes an authorization duration condition and a first password that corresponds with an authorization start time, wherein the authentication system is configured to generate a same password as the first password; and determining, whether to authorize the first access request by:

obtaining a current clock information;

generating a password sequence having a plurality of passwords based on the current clock information;

determining the authorization start time by searching for the first password in the password sequence;

authorizing access when a result of the search indicates that the current clock information is not earlier than the authorization start time;

providing a temporary code by the authentication system in response to determining to authorize the first access request, wherein the first input code has a first length, and the temporary input code has a second length shorter than the first length;

granting the temporary code validity while the first access request is authorized receiving a second access request, wherein the second access request includes a second input code; and determining whether to authorize the second access request by comparing the temporary code with the second input code.

10. The authentication system of claim 9 wherein the authorization duration condition includes an authorization end time and the current clock information is not later than the authorization end time.

11. The authentication system of claim 9, wherein the authorization duration condition comprises:

an authorization duration and the current clock information is not later than the sum of the authorization start time and the authorization duration.

12. The authentication system of claim 9, wherein the authorization duration condition comprises:

a number of times of authorization, and the first access request has not used up the number of times of authorization.

13. The authentication system of claim 9, wherein the password matrix comprises:

a set of character strings that are randomly generated.

14. The authentication system of claim 9, wherein a first clock on the authentication system is synchronous with a second clock on the authorization generation system.

15. The authentication system of claim 9, wherein the authentication system is physically isolated from the authorization generation system.

16. The authentication system of claim 9, further comprising a server.

* * * * *